United States Patent
Henri et al.

(10) Patent No.: US 11,727,307 B2
(45) Date of Patent: Aug. 15, 2023

(54) MULTI-AGENT SHARED MACHINE LEARNING APPROACH FOR REAL-TIME BATTERY OPERATION MODE PREDICTION AND CONTROL

(71) Applicants: TOTAL SOLAR INTERNATIONAL, Courbevoie (FR); NORTH CAROLINA STATE UNIVERSITY, Raleigh, NC (US)

(72) Inventors: Gonzague Henri, Raleigh, NC (US); Carlos Carrejo, Courbevoie (FR); Ning Lu, Raleigh, NC (US)

(73) Assignees: TOTAL SOLAR INTERNATIONAL, Courbevoie (FR); NORTH CAROLINA STATE UNIVERSITY, Raleigh, NC (US)

(*) Notice: Subject to any disclaimer, the term of this patent is extended or adjusted under 35 U.S.C. 154(b) by 194 days.

(21) Appl. No.: 16/957,208

(22) PCT Filed: Dec. 28, 2017

(86) PCT No.: PCT/US2017/068718
§ 371 (c)(1),
(2) Date: Jun. 23, 2020

(87) PCT Pub. No.: WO2019/132919
PCT Pub. Date: Jul. 4, 2019

(65) Prior Publication Data
US 2021/0004720 A1      Jan. 7, 2021

(51) Int. Cl.
G06N 20/00      (2019.01)
G06F 16/23      (2019.01)
(Continued)

(52) U.S. Cl.
CPC ......... *G06N 20/00* (2019.01); *G06F 16/2379* (2019.01); *G06N 3/04* (2013.01); *G06N 3/08* (2013.01)

(58) Field of Classification Search
None
See application file for complete search history.

(56) References Cited

U.S. PATENT DOCUMENTS 10,474,213 B1 *   11/2019   Brown ................. G06F 1/3212
10,726,334 B1 *   7/2020    Elnahrawy ........... G06N 3/0454
(Continued)

FOREIGN PATENT DOCUMENTS

DE      10 2016 103 758 A1      9/2017
EP           3 252 700 A1       12/2017
WO      WO 2015/013677 A2       1/2015

OTHER PUBLICATIONS

Office Action dated Nov. 29, 2021 in corresponding European Patent Application No. 17 835 910.5, 6 pages.
(Continued)

*Primary Examiner* — Olabode Akintola
(74) *Attorney, Agent, or Firm* — Oblon, McClelland, Maier & Neustadt, L.L.P.

(57) ABSTRACT

A method, system, and device for controlling energy storage devices are provided, the method including receiving a trained machine learning model from a centralized machine learning system, recording temporal data for a respective energy storage device, periodically transmitting the temporal data to the machine learning system, performing a mode prediction for controlling the energy storage device using the trained machine learning model and the temporal data, and sending a control signal to the energy storage device to operate in the predicted mode. The machine learning system aggregates the temporal data transmitted by each agent and uses the aggregated temporal data to update the machine (Continued)

learning model. By using aggregated temporal data, less data is needed from an individual energy storage device so that when a new energy storage device joins the machine learning system, the new energy storage device can benefit from increased performance with less computation.

20 Claims, 10 Drawing Sheets

(51) Int. Cl.
  *G06N 3/04* (2023.01)
  *G06N 3/08* (2023.01)

(56) References Cited

U.S. PATENT DOCUMENTS

| | | |
|---|---|---|
| 2008/0262820 A1 | 10/2008 | Nasle |
| 2015/0057821 A1 | 2/2015 | Nasle |
| 2017/0192398 A1 | 7/2017 | Nasle |
| 2017/0351234 A1* | 12/2017 | Chen ..................... H02J 7/34 |

OTHER PUBLICATIONS

International Search Report dated Jul. 16, 2018 in PCT/US2017/068718 filed on Dec. 28, 2017.

* cited by examiner

| k | SOC | PV | Price import | Hour | Previous load | Day of week | Month | Capacity to discharge | Weekday | Sun forecast PV | Previous PV | Capacity to charge | Day | Temperature |
|---|---|---|---|---|---|---|---|---|---|---|---|---|---|---|
| 1 | 9 | 35 | 56 | 21 | 0 | 4 | 4 | 0 | 0 | 0 | 7 | 15 | 0 | 0 |
| 2 | 22 | 75 | 77 | 25 | 1 | 16 | 10 | 0 | 0 | 0 | 33 | 39 | 0 | 0 |
| 3 | 40 | 92 | 83 | 28 | 1 | 45 | 25 | 0 | 0 | 0 | 65 | 68 | 0 | 0 |
| 4 | 66 | 114 | 94 | 33 | 4 | 73 | 38 | 0 | 0 | 0 | 76 | 100 | 0 | 1 |
| 5 | 84 | 137 | 106 | 35 | 10 | 91 | 48 | 1 | 0 | 0 | 111 | 123 | 0 | 1 |
| 6 | 95 | 147 | 140 | 57 | 53 | 96 | 50 | 3 | 0 | 0 | 148 | 144 | 0 | 6 |
| 7 | 98 | 149 | 148 | 135 | 83 | 97 | 50 | 5 | 3 | 15 | 149 | 146 | 0 | 15 |
| 8 | 109 | 149 | 149 | 146 | 102 | 111 | 50 | 25 | 17 | 45 | 149 | 147 | 0 | 72 |
| 9 | 124 | 149 | 149 | 149 | 115 | 119 | 51 | 62 | 35 | 80 | 149 | 149 | 0 | 113 |
| 10 | 141 | 149 | 149 | 149 | 138 | 126 | 52 | 93 | 50 | 97 | 149 | 149 | 5 | 134 |
| 11 | 147 | 149 | 149 | 149 | 149 | 149 | 56 | 122 | 72 | 110 | 149 | 149 | 44 | 149 |
| 12 | 148 | 149 | 149 | 149 | 149 | 149 | 100 | 144 | 105 | 133 | 149 | 149 | 77 | 149 |
| 13 | 149 | 149 | 149 | 149 | 149 | 149 | 137 | 149 | 149 | 149 | 149 | 149 | 149 | 149 |
| 14 | 149 | 149 | 149 | 149 | 149 | 149 | 149 | 149 | 149 | 149 | 149 | 149 | 149 | 149 |

FIG. 2

MULTI-AGENT SHARED MACHINE LEARNING APPROACH FOR REAL-TIME BATTERY OPERATION MODE PREDICTION AND CONTROL

FIELD OF THE DISCLOSURE

The present disclosure relates generally to a machine learning approach that may be used, for example, for real-time battery operation mode prediction and control for residential PV applications.

BACKGROUND

High penetration of residential and commercial rooftop photovoltaic (PV) systems may increase power fluctuations in distribution feeders and reverse power flow directions. As a result, utilities start to experience many voltage issues, such as over-voltage, large voltage ramps, and voltage swings. The intermittency of the solar generation resources and backfeeding power are the two main causes of those problems. To alleviate those issues, utilities are revising their rate structure to provide incentive for the customers to self-consume the solar they generated and limit the amount of power that can be backfed to the main grid. For example, Germany lowered the feed-in-tariff, while in Hawaii, backfeeding is no longer allowed for newly installed PV systems, per public utility commission order in 2014. See P. Denholm and R. Margolis, "Energy Storage Requirements for Achieving 50% Solar Photovoltaic Energy Penetration in California," *Nrel*, no. August, 2016; and "PUC Decision and Order 32499," 2014. Therefore, installing energy storage devices (ESDs) to store excess solar power and smooth the power fluctuations is an increasingly attractive option for residential and commercial PV systems.

For residential PV applications, ESDs are used to fulfill different objectives. The objectives of scheduling and dispatch the battery systems include minimizing utility bills, smoothing PV outputs, maximizing self-consumed solar energy, or providing different grid services. See T. Hubert and S. Grijalva, "Modeling for residential electricity optimization in dynamic pricing environments," *IEEE Transactions on Smart Grid*, vol. 3, no. 4, pp. 2224-2231, 2012; Y. Wang, S. Member, X. Lin, S. Member, M. Pedram, and A. Integrating, "A Near-Optimal Model-Based Control Algorithm for Households Equipped With Residential Photovoltaic Power Generation and Energy Storage Systems," *IEEE Transaction on Sustainable Energy*, vol. 7, no. 1, pp. 1-10, 2015; and M. Giuntoli and D. Poli, "Optimized thermal and electrical scheduling of a large scale virtual power plant in the presence of energy storages," *IEEE Transactions on Smart Grid*, vol. 4, no. 2, pp. 942-955, 2013, each incorporated herein by reference in their entirety.

A variety of optimization methods, such as Dynamic Programming, Fuzzy Logic, Mixed Integer Programming (MIP), and Stochastic Programming, have been proposed to solve those scheduling problems and dispatch the battery power outputs in real-time. See L. Liu, Y. Zhou, Y. Liu, and S. Hu, "Dynamic programming based game theoretic algorithm for economical multi-user smart home scheduling," *Midwest Symposium on Circuits and Systems*, pp. 362-365, 2014; Zhi Wu, Xiao-Ping Zhang, J. Brandt, Su-Yang Zhou, and Jia-Ning Li, "Three Control Approaches for Optimized Energy Flow With Home Energy Management System," *IEEE Power and Energy Technology Systems Journal*, vol. 2, no. 1, pp. 21-31, 2015; M. C. Bozchalui, S. A. Hashmi, H. Hassen, C. A. Cañizares, and K. Bhattacharya, "Optimal operation of residential energy hubs in smart grids," *IEEE Transactions on Smart Grid*, vol. 3, no. 4, pp. 1755-1766, 2012; and Z. Yu, L. Jia, M. C. Murphy-Hoye, A. Pratt, and L. Tong, "Modeling and stochastic control for home energy management," *IEEE Transactions on Smart Grid*, vol. 4, no. 4, pp. 2244-2255, 2013, each incorporated herein by reference in their entirety. Those approaches try to find the optimal power outputs of the battery at each dispatch interval over a given scheduling period and meet the battery operational constraints.

Nine operation modes have been proposed and used to prove that the mode-based approach is less sensitive to load and PV forecasting errors and its performance across different load patterns are consistent. See G. Henri, N. Lu, and C. Carrejo, "Design of a Novel Mode-based Energy Storage Controller for Residential PV Systems," in *IEEE PES Innovative Smart Grid Technologies, Europe*, 2017, and International Application No. PCT/US2017/043311, filed Jul. 21, 2017, incorporated herein by reference in their entirety. Because the mode-based approach greatly simplified the operation states a battery bank can operate on, it is possible for a controller to learn under which condition a specific mode is the optimal mode. It has been proposed to reduce the number of modes to five and develop a machine learning (ML) based algorithm to link the optimal mode chosen to the operational conditions house per house. See G. Henri, N. Lu, C. Carrejo, and S. A. Total, "A Machine Learning Approach for Real-time Battery Optimal Operation Mode Prediction and Control," in *IEEE PES Transmission & Distribution Conference*, 2018, and International Application No. PCT/US2017/066778, filed Dec. 15, 2017, incorporated herein by reference in their entirety.

For residential applications, an issue is to find when to charge and when to discharge—instead of the optimal charging and discharging power. Accordingly, what is needed, as recognized by the present inventors, is a method for controlling an energy storage system.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a multi-agent shared machine learning system for energy storage devices that includes a centralized machine learning system, having one controller configured to train a machine learning model, and a plurality of agents. Each agent including another controller. The other controller is configured to receive a trained machine learning model from the machine learning system, record temporal data for a respective energy storage device, periodically transmit the temporal data to the machine learning system, perform a mode prediction for controlling the energy storage device using the trained machine learning model and the temporal data, and send a control signal to the energy storage device to operate in the predicted mode. The centralized machine learning system aggregates the temporal data transmitted by each agent and uses the aggregated temporal data to update the machine learning model.

The present disclosure relates to an agent for controlling an energy storage device, the agent including a controller. The controller is configured to receive a trained machine learning model from a machine learning system, record temporal data obtained from the energy storage device, periodically transmit the temporal data to the machine learning system, perform a mode prediction for controlling the energy storage device using the trained machine learning model and the temporal data, and send a control signal to the energy storage device to operate in the predicted mode.

The present disclosure relates to a method that controls energy storage devices by a centralized machine learning system, including one controller configured to train a machine learning model and a plurality of agents. Each agent includes another controller. the method receives a trained machine learning model from the machine learning system. Temporal data for a respective energy storage device is recorded. The temporal data is periodically transmitted to the machine learning system. A mode prediction is performed for controlling the energy storage device using the trained machine learning model and the temporal data. A control signal is sent to the energy storage device to operate in the predicted mode. The centralized machine learning system aggregates the temporal data transmitted by each agent and uses the aggregated temporal data to update the machine learning model.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 is a table for a feature set according to an exemplary aspect of the disclosure;

DETAILED DESCRIPTION

Figure 1:
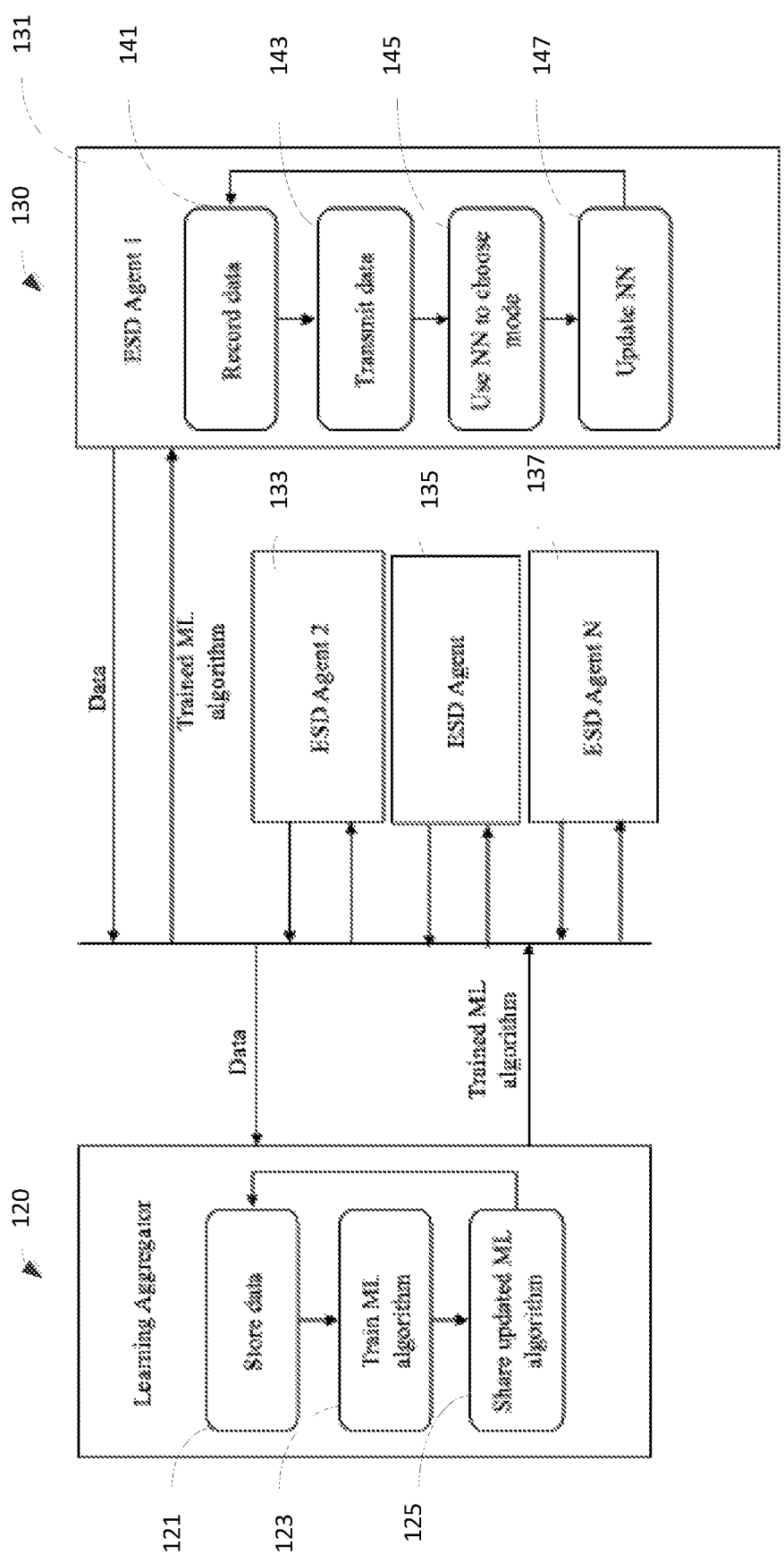
FIG. 1 is an exemplary diagram of an architecture for shared machine learning according to an exemplary aspect of the disclosure.

Referring now to the drawings, wherein like reference numerals designate identical or corresponding parts throughout several views, the following description relates to a shared learning structure between a learning aggregator and agents, and the application of machine learning (ML) algorithms to learn from historical data in order to predict the mode for the next time step.

In one or more embodiments, the disclosure relates to real-time battery operation mode prediction and control for residential photovoltaic (PV) applications. As mentioned above, five battery modes may be used to characterize the operation states a battery bank can operate on. Consistent with the disclosed embodiments, the learning process is shared among the devices, e.g., a population of batteries. For example, all the energy storage devices (ESDs) share their historical data with a learning aggregator in order to train a ML algorithm for the mode prediction. The learning aggregator then sends the trained algorithm back to the agents. Its role will be to train and maintain the ML algorithm. First, from the historical data, the optimal battery operation mode for each operation time step is derived. Performances are tested with different number of houses in the training test and different training lengths. Another scenario will consist in having a distinct set of houses for training and testing. Then, the shared-algorithm will be used to predict future operation mode for real-time operation. A comparison on bill savings is made with the model-predictive control approach using the residential load and PV data from the Pecan Street project website under a self-consumption case.

In one embodiment, the battery or an energy storage device (ESD) may store renewable energy generated by a renewable generation system such as solar photovoltaics. The renewable generation system may include a wind power generation system (e.g., wind mills), a hydraulic energy source, a micro combined heat and power (CHP) unit for heating and electricity generation, or any other energy system from renewable sources such as rain, tides, or wave. The energy storage device may be a fuel cell, a thermal energy storage device, a bioelectrochemical energy storage device, a hybrid energy storage device, or the like. The ESD may also store energy supplied by a grid.

The methodologies described herein may be applied in aggregated distributed energy resource systems that include electric battery storage in a commercial building, an industrial building, or a residential building. The ESD may be a large-capacity battery bank used in a data center or a smart grid.

As many as nine operation modes have been determined for a battery. In the present disclosure, operation modes have been simplified to five real-time operation modes in order to increase computation speed. In an exemplary aspect, modes may be added or deleted to meet desired performance requirements. In one embodiment, a battery may have the five real-time operation modes, as shown in Table I. The modes will operate the battery in real-time while a mode selection process will schedule a mode for each time step and the battery will operate in an operating mode.

TABLE I

SIMPLIFIED MODES OF THE ESD CONTROLLER

| Idle | 0 | Idle |
|---|---|---|
| Charge | 1 | Charge by the net load, $|P_{net}|$, if $P_{net}$ < 0 |
| | 2 | Charge by the rated power, $P_{rated}$ |
| Discharge | 3 | Discharge following the net load, $|P_{net}|$, if $P_{net}$ > 0 |
| | 4 | Discharge by the rated power, $P_{rated}$ |

The battery power output in each mode may be calculated as follows. First, calculate the netload, $P_{net}$, where $P_{load}$ represents the load and Psol represents the solar energy generated.

$$P_{net}(i)=P_{load}(i)-P_{sol}(i) \quad (1)$$

Then, the battery charging power cap, $P_{CCap}$, is calculated for time interval i based on the current battery energy level, $E_B(i)$, and the battery energy limit, $E_{max}$, $$|P_{CCap}(i)=(E_{max}-E_B(i))/\Delta(t) \quad (2)$$

For the battery discharging power cap, $P_{DCap}$, for time interval i based on the current battery energy level, $E_B(i)$, and the battery energy limit, $E_{min}$, $$P_{DCap}(i)=(E_B(i)-E_{min})/\Delta(t) \quad (3)$$

The power charging cap shows that, considering how much more energy can be stored in the battery, the maximum charging power of the battery for the $i^{th}$ interval. Then, the battery charging/discharging power at the $i^{th}$ time interval, $P_B(i)$ at mode m can be represented as:

$$P_B(i)|_{m=0}=0 \quad (4)$$

$$P_B(i)|_{m=1}=\max(0,\min(P_{CCap}(i),-P_{net}(i),P_{rated})) \quad (5)$$

$$P_B(i)|_{m=3}=\max(0,\min(P_{rated},P_{CCap}(i))) \quad (6)$$

$$P_B(i)|_{m=5}=-\max(0,\min(P_{DCap}(i),P_{net}(i),P_{rated})) \quad (7)$$

$$P_B(i)|_{m=7}=-\max(0,\min(P_{rated},P_{DCap}(i))) \quad (8)$$

$$i\in[1,N] \quad (9)$$

An approach referred to as Economic Model Predictive Control (EMPC) may be used to control Electronic Storage Devices (ESD) and obtain an initial training set for the disclosed machine learning. In addition, the EMPC may be used to obtain optimal modes to be used as training data for machine learning.

Load and PV generation data were obtained from the PECAN street project website. See "Pecan Street Project", incorporated herein by reference in its entirety. In this project, 149 houses with PV installations were selected. Those houses are located in Austin, Tex. and have 8760 hourly points collected in 2015. For each house, a mode-based control algorithm was run using the actual load and PV data (i.e. the forecast is perfect) to obtain the optimal operation modes, m*(i, j), for hour i house j. This process gives the optimal modes at 8760 hours for all the 149 houses. Those data may be used to train a ML algorithm. For dispatch interval i, the mode-based algorithm was also ran with an average load forecast, which is the algorithm with the best performance as demonstrated in G. Henri, N. Lu, and C. Carrejo, "Design of a Novel Mode-based Energy Storage Controller for Residential PV Systems," in *IEEE PES Innovative Smart Grid Technologies, Europe,* 2017, incorporated herein by reference in its entirety. Thus, two benchmarks were obtained: modes selected using a perfect load forecaster and modes selected using an average load forecaster. A perfect load forecaster is one that has perfect knowledge of future loads.

In an exemplary aspect, the perfect forecast vector may be used to calculate a mode selection accuracy, the vector based on the average load forecast may be used as a benchmark to demonstrate the ML approach compared with the EMPC based approach. The EPMC approach is based on optimizing the energy bill for a predetermined period (e.g., 24 hours) without considering the feasibility of the energy storage device control actions. As described herein, the EMPC refers to a rolling window optimization based control approach, which, depending on how the optimization method is formulated, the feasibility can be considered. It has been determined that the EMPC with perfect forecast yields the most savings.

In one embodiment, a shared learning structure splits intelligence between ESD Agents and a Learning Aggregator. The shared learning structure may be a system that includes several energy storage devices and associated controllers, which are in communications with the Learning Aggregator. The Learning Aggregator may include a controller and a database management system. In an exemplary embodiment, the database management system may be a single file, a file system, or a database system maintained by a search process, such as a relational database management system. Communications between ESD agents and the Learning Aggregator may use a wired or wireless network, and a protocol such as Transmission Control Protocol/Internet Protocol (TCP/IP).

To minimize the electricity bill, the batteries may make a rational decision based on the cost of electricity. In the same utility territory, similar houses should be submitted to the same electricity tariffs, or if the batteries are a member of the same aggregator they will also be subject to similar prices. Based on this observation, the inventors have determined that the ESD controllers from different houses should operate the battery in similar fashion based on the prices they observe. Therefore, the present disclosure relates to sharing the historical data in order for the ML algorithm to require less time to gather enough data.

An exemplary architecture for sharing the data in a ML algorithm is shown in FIG. 1. The architecture is provided with the intelligence being split between a Learning Aggregator 120 and individual devices 130. An exemplary aspect is offline learning by training of a ML algorithm at the Learning Aggregator 120. The individual devices 130 may include a number N of ESD Agents 131, 133, 135, 137, representing the intelligence in the homes, may record data 141 and transfer/transmit 143 the data to the Learning Aggregator 120. Also, the ESD Agents 131, 133, 135, 137 may use the trained ML algorithm to predict and select the control modes 145. The Learning Aggregator 120 may receive and store 121 the recorded data from the ESD agents 131, 133, 135, 137 and may perform training of the ML algorithm 123. An exemplary aspect is online learning by training the ML algorithm over time using updated data received from the ESD agents. The Learning Aggregator 120 may use updated data that is received from all of the ESD agents to train the ML algorithm. As time passes, each agent may update the ML algorithm 147 with a shared updated ML algorithm 125 transmitted from the Learning Aggregator 120.

In an exemplary aspect, the data used to train the ML algorithm may include historical data, forecasted data, and previous prediction data. A feature set consisting of fourteen features was selected for use in training and testing ML algorithms. It was determined that about eight features provided highest accuracy. Subsequently, in one embodiment, a feature set of all fourteen features has been selected for use in training a ML algorithm. FIG. 2 is a table showing an example of data for the fourteen features. Although an example feature set includes fourteen features, other numbers of features may be used for training a ML algorithm depending on desired performance. The fourteen features include: the state of charge (SOC), Previous PV generated power, Previous battery load from last time step ($P_{load}(i-1)$, $P_{sol}(i-1)$), PV generated power forecast for the current time step $$P\left(\begin{array}{c}f\\sol\end{array}(i)\right),$$

the remaining energy storage Capacity to Charge or Discharge ($E_{max}-E_i$, $E_i-E_{min}$), the Sum of forecasted PV power for the next 24 hours $$\left(\sum_{i=1}^{24} Psol(i)\right),$$

Temperature, Hour, Day of the week, Month, Day of the month, Weekday, and the Price to import electricity ($C_{import}$) Values of these fourteen features may be recorded in the ESD agents. In 143, the recorded data is transmitted to the Learning Aggregator 120. Thus, the training set may contain these fourteen features.

An exemplary aspect of the disclosed shared machine learning approach is use of the ML approach for mode prediction. The approach for the real-time use of a ML algorithm for residential ESD control is divided between two sections, the ESD agent that will record, transmit data and use the ML algorithm to predict the control mode. The second section is the Learning Aggregator that may obtain historical data, train a ML algorithm and then transmit the trained (or updated) algorithm to the ESD Agents.

ESD Agent

The ESD agent may have two tasks. The first task is to record and transmit data to the Learning Aggregator. The second task is to generate (through measurements or API) the set of features in order to be able to predict the next mode. Once the data are received, the trained ML algorithm may be used to provide a mode prediction. In an exemplary aspect, the mode prediction may be sent to a battery for the next time step operations.

Figure 3:
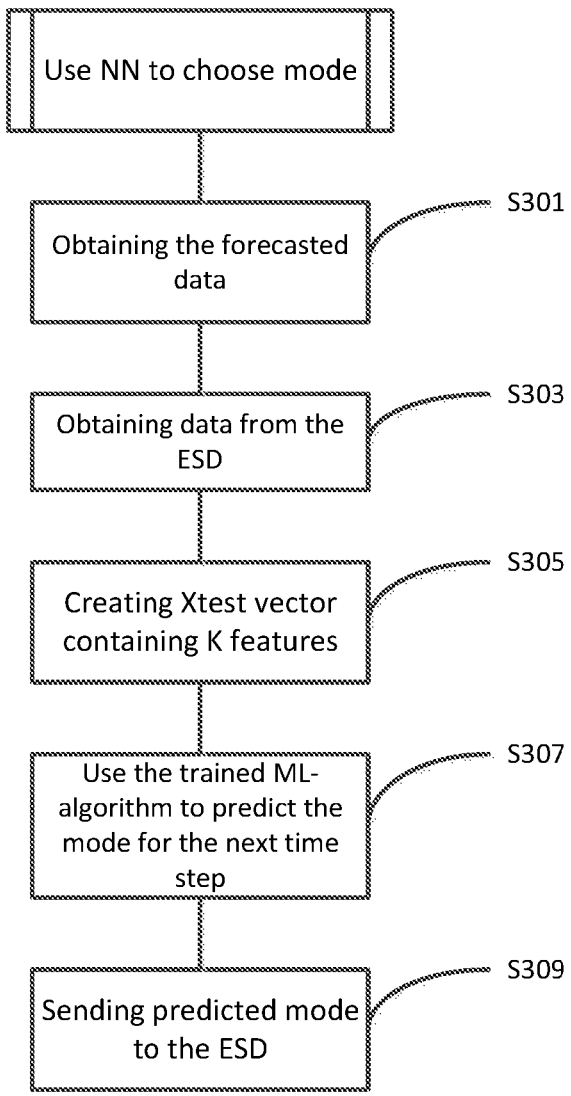
FIG. 3 is a flowchart of an energy storage device (ESD) agent algorithm according to an exemplary aspect of the disclosure.

FIG. 3 is a flowchart of the ESD Agent using the trained ML algorithm of 145 of FIG. 1. In S301 and S303, the ESD agent may, at each time step, obtain values for the fourteen features mentioned above. As the first task, the values of the fourteen features may be transmitted to the Learning Aggregator.

The second task is real-time control, in S305, in which an agent may generate at each time step a Xtest vector of a length equal to the number of features corresponding to the data needed to predict the mode for the next time step. To populate this vector, the agent will need data from a smart meter connected to a battery, the ESD, and different APIs (including temperature, PV forecast, and electricity prices). In S307, this vector is sent to the ML algorithm 145 in order to predict the mode for the next time step. Then, in S309, the predicted mode is sent to the ESD for the next time step operation. This set of actions may be repeated at each time step. In an exemplary aspect, the time step may be one hour.

Learning Aggregator

Figure 4:
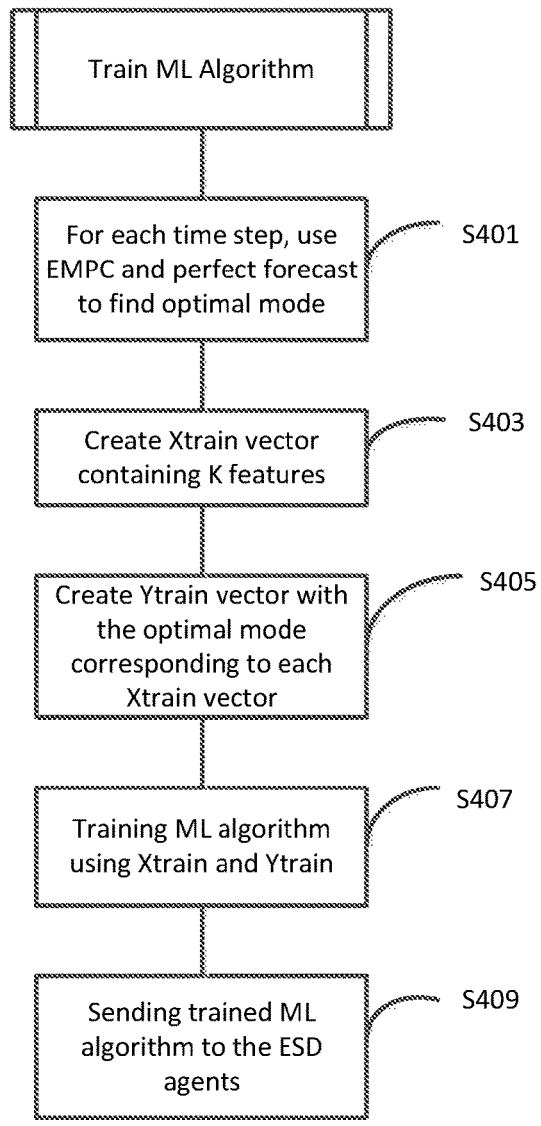
FIG. 4 is a flowchart of a learning aggregator algorithm according exemplary aspect of the disclosure.

FIG. 4 is a flowchart of the training process 123 performed in the learning aggregator 120. In S401, for the number of time steps recorded, the EMPC mode based algorithm and perfect forecast are used to find an optimal mode for each time step. In S403, a Xtrain vector is created for K features, for example the fourteen features in the training set. In S405, a Ytrain vector is created with the optimum mode corresponding to each Xtrain vector. In S407, the ML algorithm is trained using the Xtrain vectors and Ytrain vectors. In S409, the trained ML algorithm may be sent to each of the ESD agents.

Figure 5:
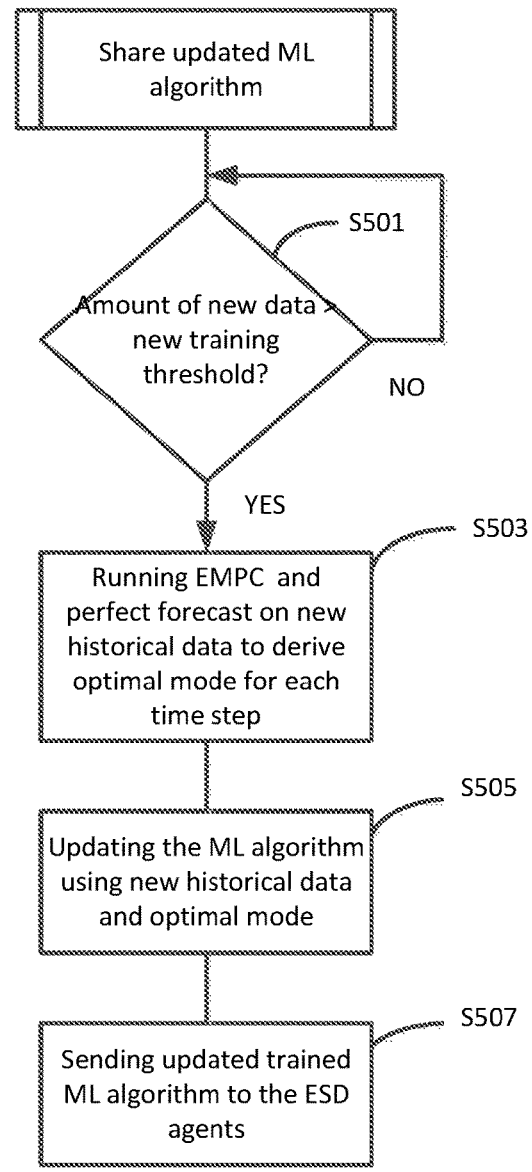
FIG. 5 is a flowchart of updating machine learning (ML) algorithm training according to an exemplary aspect of the disclosure.

FIG. 5 is a flowchart of the updating process 125 performed in the learning aggregator 120. In S501, when the Learning Aggregator is operational such that the amount of new data recorded is greater than a new training threshold, in S503, the EMPC mode based algorithm and perfect forecast on new historical data is run to derive optimal mode for each time step. In S505, the new historical data and optimal modes are used to update the ML algorithm. In S507, the updated trained ML algorithm may be sent to the ESD agents.

Figure 6:
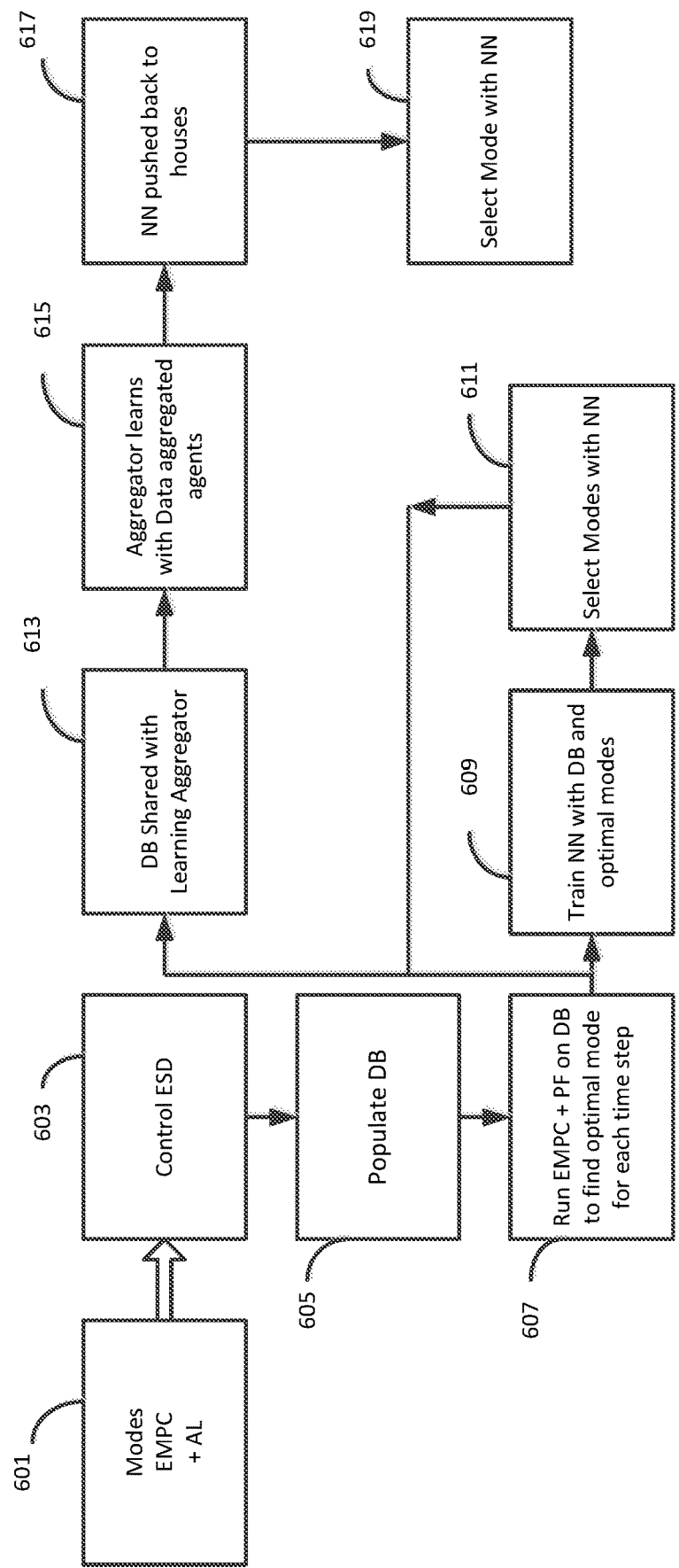
FIG. 6 is a flowchart that shows an example of shared machine learning according to an exemplary aspect of the disclosure.

FIG. 6 is a flowchart that shows an example of shared machine learning according to an exemplary aspect of the disclosure. The example illustrates how the processes in FIGS. 3, 4, and 5 may be performed. Initially, a machine learning algorithm may not have sufficient data for training.

In order to determine what might be sufficient data for training a machine learning algorithm, the impact of the training length and of the number of houses in the training set was quantified based on accuracy. Two testing/simulation scenarios were designed and will be described further below. The first scenario included 149 houses in the training set. The month of August was reserved for testing and up to 11 months per house for training. The ML algorithm was then trained with two to 11 months of training data and from nine to 149 houses, with 10 houses and one month increment. The second scenario was similar to the first scenario for the temporal part. However, the houses were split in two groups, one for testing, one for training. The accuracy is the case where the algorithm has never observed data from the houses in the testing set. The training set may contain up to 119 houses while the testing set may have up to 30 houses. Following with continuous features and a large data set, it was determined that state vector machines (SVM) and NN may perform the best. See S. Kotsiantis, I. Zaharakis, and P. Pintelas, "Supervised machine learning: A review of classification techniques," *Informatica*, vol. 31, pp. 249-268, 2007, incorporated herein by reference in its entirety. It has been demonstrated that a Neural Network of one hidden layer with 20 neurons had the best accuracy performance compared to other architectures and SVM. See G. Henri, N. Lu, C. Carrejo, and S. A. Total, "A Machine Learning Approach for Real-time Battery Optimal Operation Mode Prediction and Control," in *IEEE PES Transmission & Distribution Conference*, 2018, and International Application No. PCT/US2017/066778, filed Dec. 15, 2017, incorporated herein by reference in their entirety.

Figure 7:
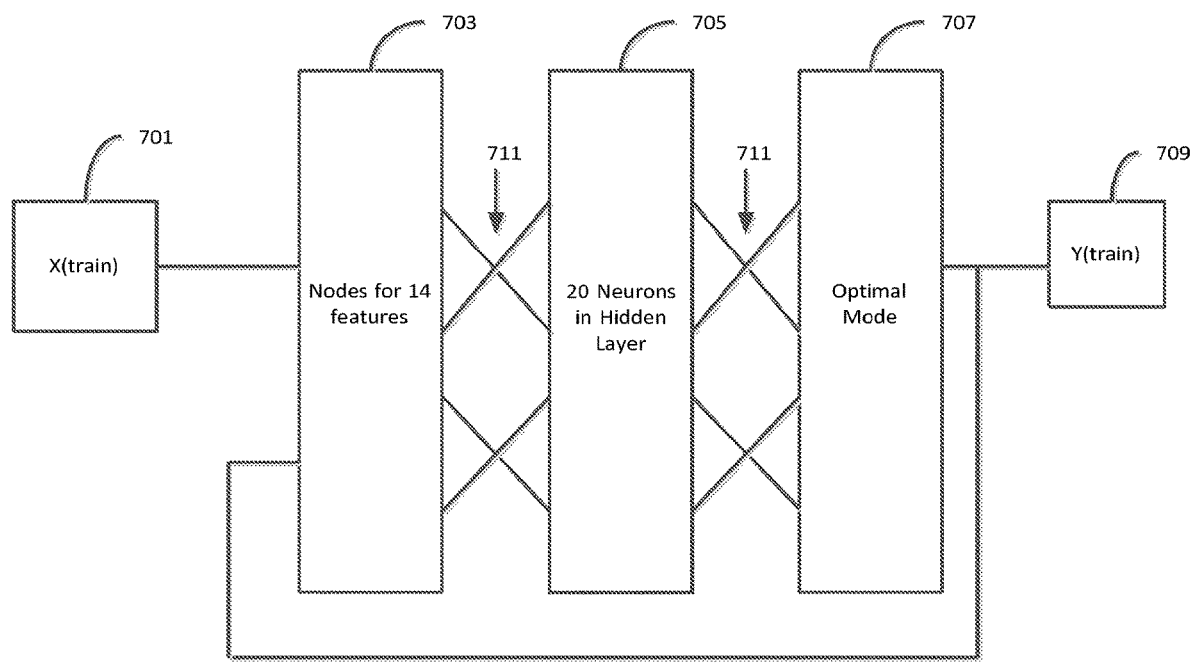
FIG. 7 is a schematic diagram of a neural network architecture according to an exemplary aspect of the disclosure.

FIG. 7 is a schematic of a Neural Network (NN) with one hidden layer that may be used for the ML algorithm. A neural network architecture is trained using a training algorithm. The Adam algorithm may be used as the training algorithm for the NN. See D. P. Kingma and J. Ba, "Adam: A Method for Stochastic Optimization," *Iclr*, pp. 1-15, 2015, incorporated herein by reference in its entirety. Adam implements a gradient descent algorithm with an adaptive learning rate. This method can be used for both offline and online training. It is particularly effective for large data sets.

The neural network may be trained using input-output vector pairs. In one embodiment, the input vector is Xtrain 701 and the output vector is Ytrain 709. During training, weighted connections 711 between neuron nodes in adjacent layers 703, 705, 707 are adjusted in value to optimize the function that the neural network models.

A neural network that undergoes training to reach an optimal output is said to be a trained neural network. An exemplary aspect is a neural network that can be trained with temporal data. In one embodiment, the neural network is trained with a feature set that includes temporal aspects such as PV generated voltage and load from a previous time step and a PV generated voltage forecast for a current time step, and a sum of forecasted PV voltages for the next 24 hours. An exemplary aspect is a neural network that can undergo continual training. In one embodiment, the neural network is periodically trained using updated data to provide an updated trained neural network. In an exemplary aspect, the new weighted connections that result from training the neural network with updated data may be transmitted by the Learning Aggregator 120 to the ESD agents, in the case that the neural network architecture remains unchanged.

Because initially there may not be enough data for training the ML algorithm, mode-based control algorithm with average load forecast can be used to operate the system until the recorded data is sufficient to train the machine learning algorithm for mode prediction. In particular, a mode-based EMPC algorithm and average load (AL) forecast 601 may be used to control the ESD 603 and the data used in control may be accumulated as initial data. See G. Henri, N. Lu, and C. Carrejo, "Design of a Novel Mode-based Energy Storage Controller for Residential PV Systems," in *IEEE PES Innovative Smart Grid Technologies, Europe,* 2017, and International Application No. PCT/US2017/043311, filed Jul. 21, 2017, incorporated herein by reference in their entirety. For the average load forecast algorithm, the yearly average load of the household is considered as the constant value for the forecaster. The inputs at this stage are the electricity prices, the temperature, the load, and the PV production. This task will last until enough data has been acquired to perform the offline training. If the Learning Aggregator has enough historical data from the ESD Agents' smart meters, then the offline training can start without the data collection period. The initial data may be transmitted to the Learning Aggregator 120 and stored in a database 605.

In 607, once a sufficient amount of the historical data is obtained, the mode-based EMPC algorithm with a perfect forecaster and a virtual battery may be run over the historical data set to obtain the optimal modes and the battery features (i.e. SOC, $E_{max}-E_i$, $E_i-E_{min}$) and the forecaster features $$\left(\text{i.e. } P_{sol}^f, \sum_{i=1}^{24} P_{sol}(i)\right)$$

at each time step. In 613, this data is shared with the Learning Aggregator 120.

After the optimal modes for each time step is obtained for the historical data set, in 609, an offline training of the ML algorithm will start. First, the training data is normalized; then, the training is performed on the regularized training set. The normalization parameters as well as the trained ML algorithm will be transmitted to an ESD agent. In an exemplary aspect, when a neural network is used as the ML algorithm, the neural network architecture may be maintained in the ESD agents. In such case, it may only be necessary to transmit the weighted connections of the neural network architecture. The normalization parameters may be used as the testing set.

Once the training on the historical data is done, in 611, the ML algorithm may replace the EMPC mode-based control algorithm of the ESD Agents. With a sufficiently trained ML algorithm, the Learning Aggregator agent will have two tasks. The two tasks are to maintain the database of historical data 613 as it is received from all ESD agents and to periodically update the ML algorithm 615, for example, every few days or weeks. In 617, the trained updated ML algorithm is broadcast to the ESD Agents, which, in 619, again are used to predict a control mode.

To keep updating the ML algorithm, the load, PV generated power, date, and temperature may be recorded at each time step by the ESD Agents. Then, as described previously, a mode-based control algorithm with a perfect forecaster and an equivalent battery model may be run on the data to find the optimal mode at each time step, and populate the training sets. Once this training set is created, the ML algorithm can be updated.

To illustrate the capabilities of each controller and associated methodologies described herein, exemplary results are presented.

The load data used in the simulation is from the Pecan Street data set. See "Pecan Street Project", incorporated herein by reference in its entirety. Provided this data, 149 houses located in Austin were selected with PV installations and with 8760 data points for the year 2015. The characteristics of the houses are summarized in Table II below. The electricity tariff is from HECO, described in Table III below. This tariff encourages customers to consume their solar generation and does not valorize backfeed to the grid. The ESD used is assumed to be the same for all houses. The ESD is 7 kWh@3.3 kW with a round-trip efficiency of 90%.

Evaluations of results may be performed using two metrics. The first one is the accuracy of the mode selection. length represents the test duration, in this case 30 days, and 720 hours. $M_{predicted}$ represents the modes predicted by the ML algorithm and $M_{optimal}$ represents the optimal modes.

$$\text{accuracy} = \frac{\sum_{i=1}^{length} M_{predicted}}{length} \qquad (10)$$

For each time step i:

$$M_{predicted}(i) = \begin{cases} 1, & \text{if } M_{predicted}(i) = M_{optimal}(i) \\ 0, & \text{otherwise} \end{cases} \qquad (11)$$

The second one is a performance index, PMSA, the percentage of the maximum savings achieved for each house, was used as described by:

$$PMSA = \frac{C_{base} - C_{simu}}{C_{base} - C_{optimal}} \qquad (12)$$

The base cost with no ESD is represented by Cbase, Coptimal is the optimal cost obtained with EMPC and a perfect forecast. Finally, Csimu is the cost using one of two the algorithms: EMPC+average load forecast, and ML-based algorithm. The PMSA is calculated for each house in the data set.

TABLE II

STATISTICAL DESCRIPTION OF 149 HOUSES SELECTED

|  | Base Case ($) | Load (kWh) | Solar Generation | Ratio PV/load |
|---|---|---|---|---|
| Mean | 1,683 | 11,596 | 6,601 | 0.64 |
| Standard deviation | 1,006 | 4,320 | 1,717 | 0.25 |
| Maximum | 10,086 | 25,433 | 12,725 | 1.57 |
| Minimum | 500 | 3,949 | 1,689 | 0.20 |
| Median | 1,552 | 10,803 | 6,833 | 0.62 |

TABLE III

TIME-OF-USE RATE IN HECO (HAWAII UTILITY)

|  | Price (c$) | Hour weekday | Hour weekend |
|---|---|---|---|
| Off peak | 18.21 | 9 PM-7 AM | 9 PM-5 AM |
| Shoulder | 23.71 | 7 AM-5 PM | 5 PM-9 PM |
| Peak | 26.71 | 3 PM-9 PM | — |

The learning algorithms are simulated using the Scikit-Learn library in Python; the optimization problem is formulated using the Pyomo library and solved by GLPK. See F. Pedregosa, G. Varoquaux, A. Gramfort, V. Michel, B. Thirion, O. Grisel, M. Blondel, G. Louppe, P. Prettenhofer, R. Weiss, V. Dubourg, J. Vanderplas, A. Passos, D. Cournapeau, M. Brucher, M. Perrot, and Duchesnay, "Scikit-learn: Machine Learning in Python," vol. 12, pp. 2825-2830, 2012; and W. E. Hart, "Python optimization modeling objects (Pyomo)," *Operations Research/Computer Science Interfaces Series*, vol. 47, pp. 3-19, 2009, each incorporated herein by reference in their entirety.

The test month is August, and the training set will contain the other months of the year. The case with MILP+perfect forecast is assumed to achieve the most savings (100%). What percentage of potential savings is achieved using the EMPC algorithm is compared with average load forecast and the shared learning algorithm. As a reference, the EMPC and average load forecast achieves 73% PMSA on the dataset.

For this test the NN is used with 20 neurons in one hidden layer using 14 features. The training length is comprised between two to 11 months, with one month increment. In this example, the same houses are used for the training and testing set. For each training set length, initially 9 houses are in the training set with an increment of ten until 149. The testing set is constituted of the 149 houses.

Figure 8:
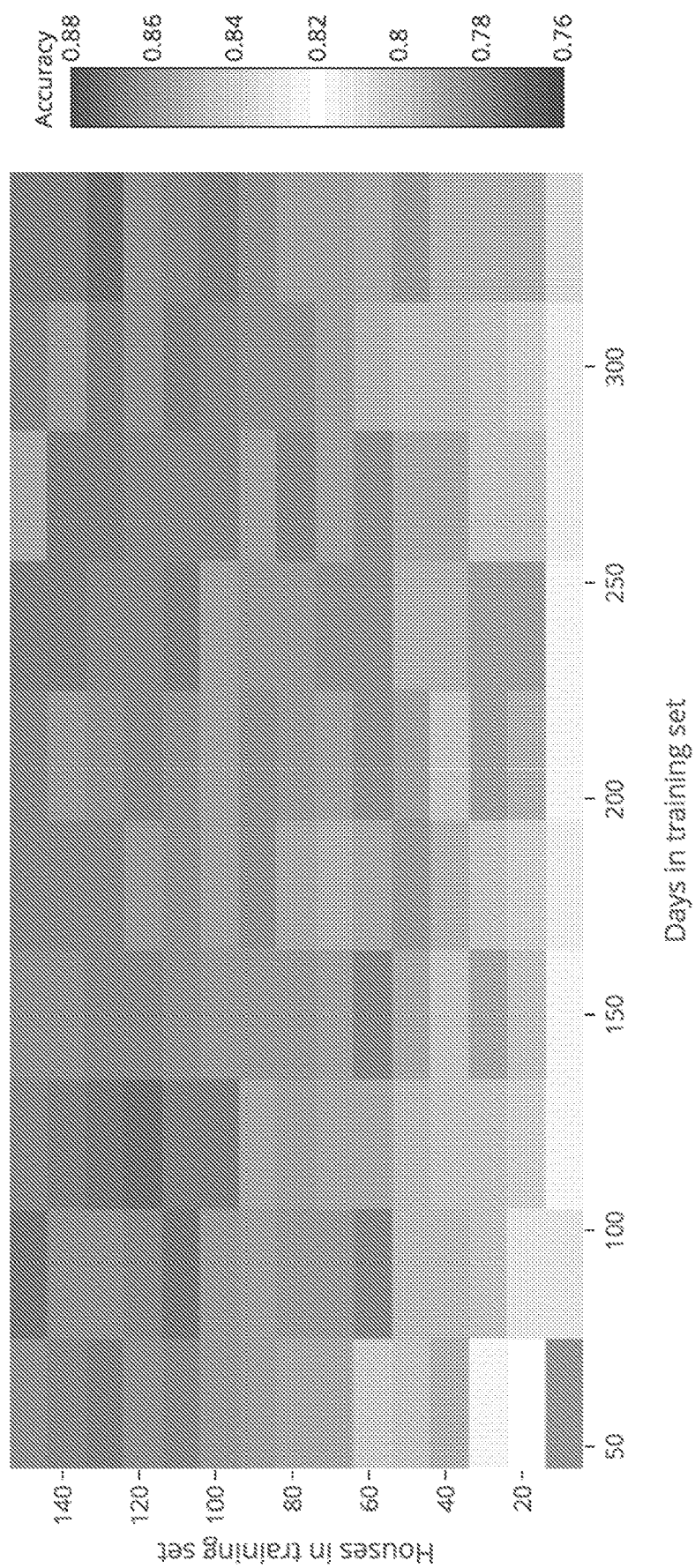
FIG. 8 is a heatmap for a first simulation scenario, showing accuracy as a function of the number of houses and number of days in the training set, where the same houses are in the training and testing sets, according to an exemplary aspect of the disclosure.
Figure 9:
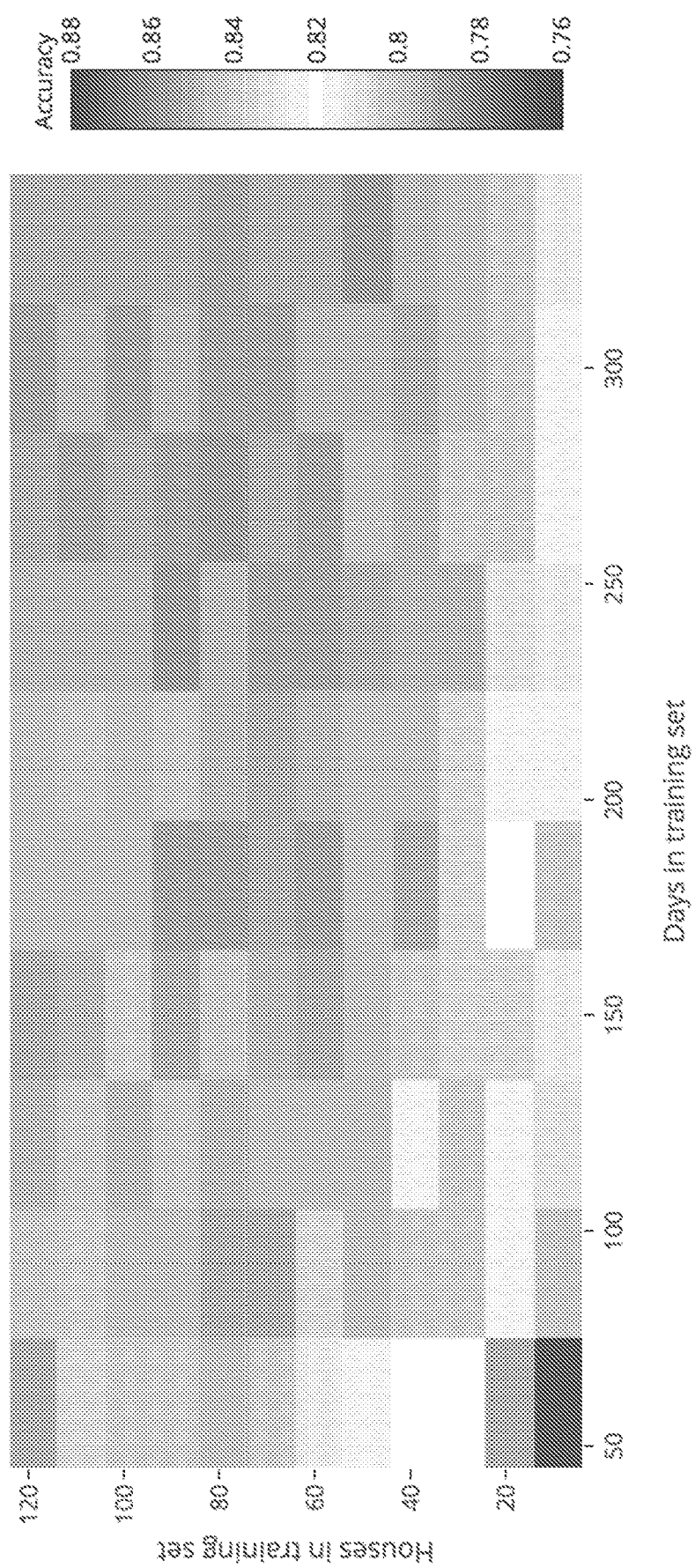
FIG. 9 is a heatmap for a second simulation scenario, showing accuracy as a function of the number of houses and number of days in the training set, where different houses are in the training and testing sets, according to an exemplary aspect of the disclosure.

As a reference data point, if a EMPC mode based algorithm is used with an average load forecast, the mean accuracy on the data set is around 73%. It can first be observed that, for both simulation scenarios, from FIG. 8 and FIG. 9, is that starting with nine houses and two months of data in the training set, the ML approach yields a higher accuracy. The worst case being 76% in the second scenario.

FIG. 8 is a heatmap for a first scenario in which the same houses are used in both the training and testing set. The heatmap shows accuracy as a function of the number of houses in the training set, and the number of days in the training set. An accuracy scale is shown to the right of the heatmap. From FIG. 8, it can be observed that the number of houses has more impact than the training length on the overall accuracy. A minimum of 60 to 70 houses is required to reach high accuracy results (superior to 85%). With a low number of houses, accuracy remains below 85%. In the superior half of FIG. 8, the results are consistent across the different training length, while with a lower number of houses in the training set, the accuracy increase with temporal data. It can be noted that the 149 layers of the heatmap represents the specific case where the all the houses in the testing set are also in the training set. It can be observed that there is high and consistent accuracy across the different training lengths.

FIG. 9 is a heatmap for a second scenario in which different houses are used in the training set than are used in the testing set. The heatmap shows accuracy as a function of number of houses in the training set and the number of days of training. An accuracy scale is shown to the right of the heatmap. The training set contains 129 houses while the testing set contains 30 houses. For each training set length, 9 houses in the training set were started with an increment of 10 until 119 for each training length previously described. The ML algorithm was not trained with any data from the 30 houses during the second simulation.

It can be observed that the accuracy increases with both the number of houses and the amount of temporal data. It can also be observed that the approach in the second scenario yields lower accuracy than the first scenario, which used the same houses in the testing and training set. However, the first scenario yields better performance than the second scenario. It can be assumed that having the data from the house being tested increases the performance compared to not having it. In other words, the trained neural network may have lower performance accuracy when it is tested against data that it has not been trained for. An aspect of the disclosure is to train a neural network using data from a group of houses including the house that is controlled, i.e., the house that controls the battery is included among the houses that provide training data. Subsequently, the trained ML algorithm in the present disclosure will be more robust when used to control a battery for a particular house. A simulation can also be run to calculate the bill based on the results of Scenario 1.

Figure 10:
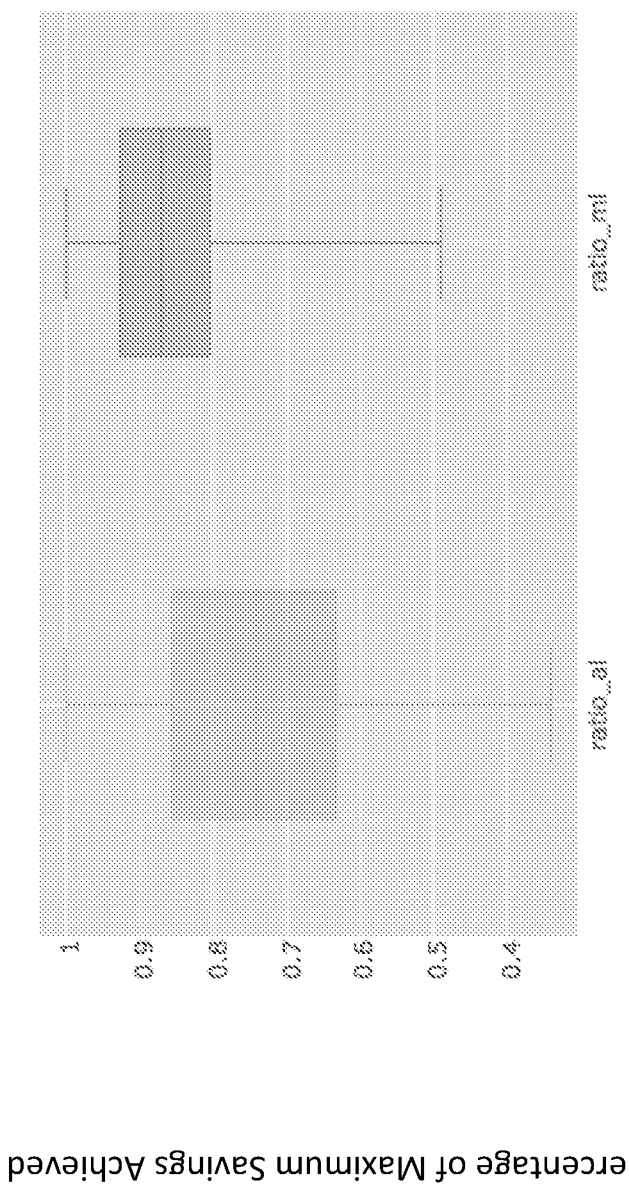
FIG. 10 is a chart of percentage of maximum savings achieved to compare algorithms, according to an exemplary aspect of the disclosure.

FIG. 10 shows the results of the simulation comparing the EMPC-based mode control with the ML-based mode control algorithm. In this simulation, the ML algorithm is trained with 11 months of data from the 149 houses and then tested for control on the August month (that is not in the training set). The ML-based algorithm yields better performance. The EMPC algorithm achieved on average 73% of the PMSA while the ML approach yielded 79%.

Figure 11:
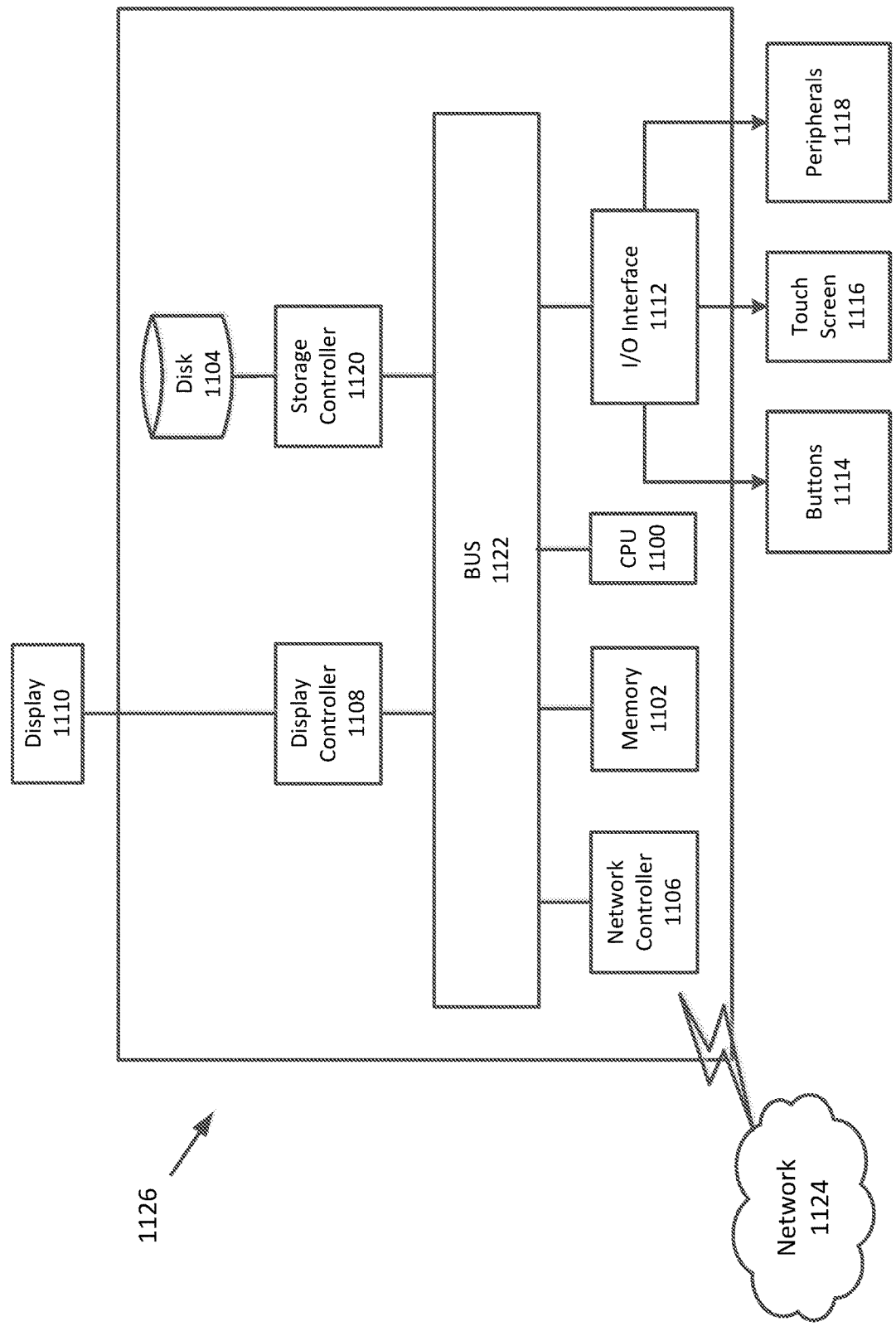
FIG. 11 is an exemplary block diagram of a computer according to one example.

In one implementation, the ESD agents and the Learning Aggregator 120 may be implemented as separate controllers. The functions and processes of each controller may be implemented by a computer 1126. Next, a hardware description of the computer 1126 according to exemplary embodiments is described with reference to FIG. 11. In FIG. 11, the computer 1126 includes a CPU 1100 which performs the processes described herein. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1126 communicates, such as a server or computer.

Further, the claimed advancements may be provided as a utility application, background daemon, or component of an operating system, or combination thereof, executing in conjunction with CPU 1100 and an operating system such as Microsoft® Windows®, UNIX®, Oracle® Solaris, LINUX®, Apple macOS® and other systems known to those skilled in the art.

In order to achieve the computer 1126, the hardware elements may be realized by various circuitry elements, known to those skilled in the art. For example, CPU 1100 may be a Xenon® or Core® processor from Intel Corporation of America or an Opteron® processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computer 1126 in FIG. 11 also includes a network controller 1106, such as an Intel Ethernet PRO network interface card from Intel Corporation of America, for interfacing with network 1124. As can be appreciated, the network 1124 can be a public network, such as the Internet, or a private network such as LAN or WAN network, or any combination thereof and can also include PSTN or ISDN sub-networks. The network 1124 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1126 further includes a display controller 1108, such as a NVIDIA® GeForce® GTX or Quadro® graphics adaptor from NVIDIA Corporation of America for interfacing with display 1110, such as a Hewlett Packard® HPL2445w LCD monitor. A general purpose I/O interface 1112 interfaces with a keyboard and/or mouse 1114 as well as an optional touch screen panel 1116 on or separate from display 1110. General purpose I/O interface also connects to a variety of peripherals 1118 including printers and scanners, such as an OfficeJet® or DeskJet® from Hewlett Packard®.

The general purpose storage controller 1120 connects the storage medium disk 1104 with communication bus 1122, which may be an ISA, EISA, VESA, PCI, or similar, for interconnecting all of the components of the computer 1126. A description of the general features and functionality of the display 1110, keyboard and/or mouse 1114, as well as the display controller 1108, storage controller 1120, network controller 1106, and general purpose I/O interface 1112 is omitted herein for brevity as these features are known.

A system which includes the features in the foregoing description provides numerous advantages. In particular, a shared machine learning approach is disclosed for real-time battery control to reduce the reliance on load forecasters. The advantages of the shared machine learning approach are summarized as follows: 1) no load forecast is needed; 2) increase the mean potential savings by 6 points compared with the EMPC based approach; 3) prediction accuracy is 86% compared with the 73% of the EMPC-based approach; 4) optimization is no longer needed at each time step so the computation speed is fast and can be done locally. Provided these advantages, less data is needed from an individual house so that when a new house joins the aggregated system, the new house can benefit from increased performance with less computation.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) A multi-agent shared machine learning system for energy storage devices, includes a centralized machine learning system, having one controller configured to train a machine learning model, and a plurality of agents, each agent having another controller. The controller for an agent is configured to receive a trained machine learning model from the machine learning system, record temporal data for a respective energy storage device, periodically transmit the temporal data to the machine learning system, perform a mode prediction for controlling the energy storage device using the trained machine learning model and the temporal data, and send a control signal to the energy storage device to operate in the predicted mode. The centralized machine learning system aggregates the temporal data transmitted by each agent and uses the aggregated temporal data to update the machine learning model.

(2) The multi-agent shared machine learning system of feature (1), in which the energy storage device is a battery, and the plurality of agents record temporal data for a population of batteries.

(3) The multi-agent shared machine learning system of features (1) or (2), in which the recording of the temporal data by each agent is performed at an interval of a predetermined time step.

(4) The multi-agent shared machine learning system of any of features (1) to (3), in which the temporal data includes at least one of state of charge, load from previous time step, generated power forecast for the current time step, remaining energy storage capacity, the sum of generated power forecasted for a predetermined period, temperature, hour, day of the week, month, day of the month, weekday, or weekend, and price of external electricity.

(5) The multi-agent shared machine learning system of any of features (1) to (5), in which the predicted mode is a scheduled operating mode of the respective energy storage device at each predetermined operating period, and the respective energy storage device is operated according to the scheduled operating mode for each predetermined operating period.

(6) The multi-agent shared machine learning system of any of features (1) to (5), in which the centralized machine learning system is configured to train the machine learning model with the aggregated temporal data while the agents perform a mode prediction for controlling the energy storage device using the trained machine learning model and the temporal data.

(7) The multi-agent shared machine learning system of any of features (1) to (6), in which the centralized machine learning system is further configured to maintain a database of aggregated temporal data, update the machine learning model after a predetermined time interval, and transmit the updated machine learning model to the plurality of agents.

(8) The multi-agent shared machine learning system of any of features (1) to (7), in which the centralized machine learning system is further configured to maintain a database of aggregated temporal data, update the machine learning model after a predetermined number of sets of aggregated temporal data are stored, and transmit the updated machine learning model to the plurality of agents.

(9) The multi-agent shared machine learning system of any of features (1) to (8), in which the machine learning model is a multi-layer neural network trained with a training rule having an adaptive learning rate.

(10) The multi-agent shared machine learning system of any of features (1) to (9), in which the centralized machine learning system transmits a matrix of connection weights for the trained machine learning model to the plurality of agents.

(11) The multi-agent shared machine learning system of any of features (1) to (10), in which the predicted mode is identified from a plurality of operating modes.

(12) An agent for controlling an energy storage device. The agent includes a controller configured to receive a trained machine learning model from a machine learning system, record temporal data obtained from the energy storage device, periodically transmit the temporal data to the machine learning system, perform a mode prediction for controlling the energy storage device using the trained machine learning model and the temporal data, and send a control signal to the energy storage device to operate in the predicted mode.

(13) A method of controlling energy storage devices by a centralized machine learning system. The centralized machine learning system includes one controller configured to train a machine learning model, and a plurality of agents. Each agent includes another controller. The method includes receiving, using the other controller, a trained machine learning model from the machine learning system; recording temporal data for a respective energy storage device; periodically transmitting, using the other controller, the temporal data to the machine learning system; performing, using the other controller, a mode prediction for controlling the energy storage device using the trained machine learning model and the temporal data; and sending, using the other controller, a control signal to the energy storage device to operate in the predicted mode. The centralized machine learning system aggregates the temporal data transmitted by each agent and uses the aggregated temporal data to update the machine learning model.

(14) The method of feature (13), in which the recording of the temporal data by each agent is performed at an interval of a predetermined time step.

(15) The method of features (13) or (14), in which the temporal data includes at least one of state of charge, load from previous time step, generated power forecast for the current time step, remaining energy storage capacity, the sum of generated power forecasted for a predetermined period, temperature, hour, day of the week, month, day of the month, weekday, or weekend, and price of external electricity.

(16) The method of any of features (13) to (15), in which the centralized machine learning system trains, using the one controller, the machine learning model with the aggregated temporal data while the agents perform a mode prediction for controlling the energy storage device using the trained machine learning model and the temporal data.

(17) The method of any of features (13) to (16), further including maintaining a database of aggregated temporal data; updating, using the one controller, the machine learning model after a predetermined time interval; and transmitting, using the one controller, the updated machine learning model to the controllers of the plurality of agents.

(18) The method of any of features (13) to (17), further including maintaining a database of aggregated temporal data; updating, using the one controller, the machine learning model after a predetermined number of sets of aggregated temporal data are stored; and transmitting, using the one controller, the updated machine learning model to the controllers of the plurality of agents.

(19) The method of any of features (13) to (18), in which the machine learning model is a multi-layer neural network, the method further includes training, using the one controller, the neural network with a training rule having an adaptive learning rate.

(20) The method of any of features (13) to (19), further includes transmitting, using the one controller, a matrix of connection weights for the trained machine learning model to the plurality of agents.

The invention claimed is:

1. A multi-agent shared machine learning system for managing a plurality of energy storage devices in an energy storage system, comprising:
 a centralized machine learning system, including one controller configured to train a machine learning model; and
  a plurality of agents, each agent including another controller configured to
   receive a trained machine learning model from the machine learning system,
   record temporal data for a respective energy storage device,
   periodically transmit the temporal data to the machine learning system,
   perform a mode prediction for controlling an amount of charging/discharging power, associated with the predicted mode, for the respective energy storage device using the trained machine learning model and the temporal data, and
   send a control signal that controls the energy storage device to operate in the predicted mode,
  wherein the centralized machine learning system aggregates the temporal data transmitted by each agent and uses the aggregated temporal data to update the trained machine learning model for the plurality of agents,
  wherein the aggregated temporal data includes generated voltage and load from a previous time step, and
  wherein the control signal that controls the energy storage device, for each of the plurality of agents, smooths power fluctuations throughout the energy storage system.

2. The multi-agent shared machine learning system of claim 1, wherein the energy storage device is a battery, and the plurality of agents record temporal data for a population of batteries.

3. The multi-agent shared machine learning system of claim 1, wherein the recording of the temporal data by each agent is performed at an interval of a predetermined time step.

4. The multi-agent shared machine learning system of claim 3, wherein the temporal data recorded at each time step includes a state of charge, the load from previous time step, generated power forecast for the current time step, remaining energy storage capacity, the sum of generated power forecasted for a predetermined period, temperature, hour, day of the week, month, day of the month, weekday, or weekend, and price of external electricity.

5. The multi-agent shared machine learning system of claim 1, wherein the predicted mode is an operating mode predicted for the respective energy storage device at a future predetermined operating period, and the respective energy storage device is operated according to the predicted operating mode for the future predetermined operating period.

6. The multi-agent shared machine learning system of claim 1, wherein the centralized machine learning system is configured to update the trained machine learning model with the aggregated temporal data while the agents perform a mode prediction for controlling the energy storage device using the trained machine learning model and the temporal data.

7. The multi-agent shared machine learning system of claim 1, wherein the centralized machine learning system is further configured to:
  maintain a database of aggregated temporal data,
  update the trained machine learning model after a predetermined time interval, and
  transmit the updated machine learning model to the plurality of agents.

8. The multi-agent shared machine learning system of claim 1, wherein the centralized machine learning system is further configured to:
  maintain a database of aggregated temporal data,
  update the trained machine learning model after a predetermined number of sets of aggregated temporal data are stored, and
  transmit the updated machine learning model to the plurality of agents.

9. The multi-agent shared machine learning system of claim 1, wherein the machine learning model is a multi-layer neural network trained with a training rule having an adaptive learning rate.

10. The multi-agent shared machine learning system of claim 1, wherein the centralized machine learning system transmits a matrix of connection weights for the trained machine learning model to the plurality of agents.

11. The multi-agent shared machine learning system of claim 1, wherein the predicted mode is predicted based on a plurality of predetermined operating modes.

12. An agent for controlling an energy storage device in an energy storage system having a plurality of energy storage devices, the agent comprising:
  a controller configured to:
    receive a trained machine learning model from a machine learning system,
    record temporal data obtained from the energy storage device,
    periodically transmit the temporal data to the machine learning system,
    perform a mode prediction for controlling an amount of charging/discharging power, associated with the predicted mode, for the respective energy storage device using the trained machine learning model and the temporal data, and
    send a control signal that controls the energy storage device to operate in the predicted mode,
  wherein the machine learning system aggregates temporal data of the plurality of energy storage devices and uses the aggregated temporal data to update the trained machine learning model, wherein the aggregated temporal data includes generated voltage and load from a previous time step, and
  wherein the control signal that controls each of the plurality of energy storage devices smooths power fluctuations throughout the energy storage system.

13. A method of controlling energy storage devices by a centralized machine learning system in an energy storage system having a plurality of energy storage devices, including one controller configured to train a machine learning model and a plurality of agents, each agent including another controller, the method comprising:
  receiving, using the other controller, a trained machine learning model from the machine learning system;
  recording, using the other controller, temporal data for a respective said energy storage device;
  periodically transmitting, using the other controller, the temporal data to the machine learning system;
  performing, using the other controller, a mode prediction for controlling an amount of charging/discharging power, associated with the predicted mode, for the respective energy storage device using the trained machine learning model and the temporal data; and
  sending, using the other controller, a control signal that controls the energy storage device to operate in the predicted mode,
  wherein the centralized machine learning system aggregates the temporal data transmitted by each agent and uses the aggregated temporal data to update the trained machine learning model for the plurality of agents, wherein the aggregated temporal data includes generated voltage and load from a previous time step, and
  wherein the control signal that controls the energy storage device, for each of the plurality of agents, smooths power fluctuations throughout the energy storage system.

14. The method of claim 13, wherein the recording of the temporal data by each agent is performed at an interval of a predetermined time step.

15. The method of claim 14, wherein the temporal data recorded at each time step includes a state of charge, the load from previous time step, generated power forecast for the current time step, remaining energy storage capacity, the sum of generated power forecasted for a predetermined period, temperature, hour, day of the week, month, day of the month, weekday, or weekend, and price of external electricity.

16. The method of claim 13, wherein the centralized machine learning system updates, using the one controller, the trained machine learning model with the aggregated temporal data while the agents perform a mode prediction for controlling the energy storage device using the trained machine learning model and the temporal data.

17. The method of claim 13, further comprising:
  maintaining a database of aggregated temporal data;
  updating, using the one controller, the trained machine learning model after a predetermined time interval; and transmitting, using the one controller, the updated machine learning model to the controllers of the plurality of agents.

18. The method of claim 13, further comprising:
maintaining a database of aggregated temporal data;
updating, using the one controller, the trained machine learning model after a predetermined number of sets of aggregated temporal data are stored; and
transmitting, using the one controller, the updated machine learning model to the controllers of the plurality of agents.

19. The method of claim 13, wherein the machine learning model is a multi-layer neural network, the method further comprising training, using the one controller, the neural network with a training rule having an adaptive learning rate.

20. The method of claim 13, further comprising transmitting, using the controller, a matrix of connection weights for the trained machine learning model to the plurality of agents.

\* \* \* \* \*